3,637,686
PROCESS FOR RECOVERING PURIFIED
MELAMINE
Ryo Kokubo, Koji Yokomichi, Yasuo Takakuwa, Isao Maruyama, and Akihiro Shiroishi, Fuchumachi, and Mizuhiko Nagakura, Tokyo, Japan, assignors to Nissan Chemical Industries, Ltd., Tokyo, Japan
Filed Feb. 10, 1969, Ser. No. 798,022
Int. Cl. C07d 55/24
U.S. Cl. 260—249.7 P      4 Claims

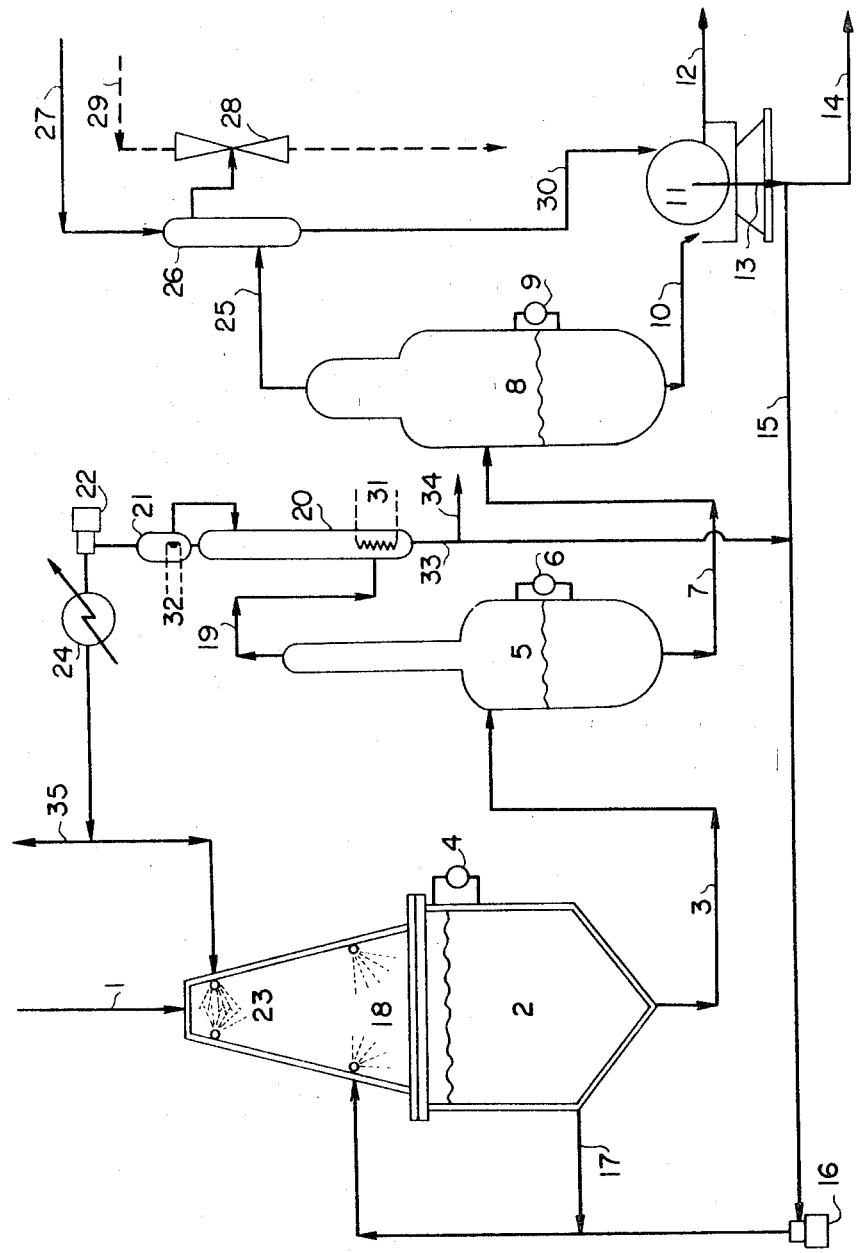

ABSTRACT OF THE DISCLOSURE

A process for recovering purified melamine comprising cooling the crude molten melamine obtained through thermal decomposition of urea or a mixture of said crude molten melamine, ammonia and carbon dioxide, etc. rapidly in two steps to dissolve the melamine, and then crystallizing the high-purity melamine in two steps.

---

The present invention relates to an industrially advantageous process for recovering purified melamine.

Up to the present time numerous proposals have been made with respect to a process for taking a crude molten melamine out of a melamine-forming reaction system under high-temperature and high-pressure and obtaining therefrom a high-purity melamine. For industrial application on an economical scale, however, these proposals have many disadvantages. Namely, the following problems arise in cooling the crude molten melamine and recovering the melamine through solidification:

(1) Melam, melem, melon, etc. are formed as the result of the deammoniating condensation of melamine;
(2) When a coolant containing water is used, ammeline, ammelide, and cyanuric acid are formed as the result of hydrolysis of melamine;
(3) How to economically inhibit the formation of the above-mentioned impurities without using great quantities of ammonia and/or huge installation and/or intricate operation;
(4) How to efficiently eliminate melam, melem, ureidomelamine (hereinafter to be referred to as melem, ureidomelamine, etc.) which are naturally formed in the synthesis of crude melamine and are hard to eliminate by the common recrystallization method because they are hard to dissolve in an aqueous alkali solution, even if the formation of said impurities can be inhibited in the step of cooling and solidifying the crude molten melamine; and
(5) How to economically recover the great quantities of ammonia and carbon dioxide produced as by-products of urea decomposition, and the ammonia, used for cooling.

The methods so far proposed as disclosed, for instance, in Japanese patent publications Sho 30–330, Sho 39–28780, Sho 40–4639 and Sho 41–11263; and U.S. Pats. 2,566,223 and 2,566,229 cannot solve all of the above problems 1 to 3. As for problem 4, treatment with an aqueous alkali solution has been proposed, but it is not recommended because it is accompanied by hydrolysis of suggest the exploitation of by-product gases, but this exploitation is not satisfactory with respect to the recovery of high energy gases.

In view of these problems, the present inventors have made various investigations and have successfully established an industrially profitable process of recovering purified melamine with all the above-mentioned problems solved.

The present invention relates to a process of recovering purified melamine, comprising the following steps: A crude molten melamine obtained by the thermal decomposition of urea or a mixture of said crude molten melamine with ammonia, carbon dioxide, etc. is cooled in a pressure cooler held at 5 to 100 kg./cm.$^2$ rapidly in two steps. In the first step liquid ammonia or cool ammonia gas is uniformly atomized and blended to cool to 200 to 270° C. and thereby solidify the melamine. In the second step said melamine is cooled by means of an aqueous solution containing ammonia to 100 to 200° C. The melamine thus solidified and cooled is then dissolved in an aqueous solution containing ammonia in the concentration of 5 to 80% by weight, preferably 20 to 50% by weight; and treating said melamine solution at 100 to 200° C. for the decomposition of its impurities. The melamine is then crystallized in two steps out of said treated melamine solution, in the first step partly crystallizing the melamine under expansion at the pressure of 1 to 15 kg./cm.$^2$ and at the same time recovering the dissolved gases, and in the second step fully crystallizing the melamine from the formed melamine slurry under a pressure in the range of 30 to 760 mm. Hg absolute and a temperature in the range of 20 to 60° C.

As stated hereafter, many new discoveries have been required to perfect the present invention.

In order to acquire the high-purity melamine, the crude molten melamine resulting from thermal decomposition of urea must be rapidly cooled and the melam, ureidomelamine etc. in the crude melamine must be decomposed and eliminated.

For the purpose of inhibiting the deammoniating condensation and hydrolysis of melamine in the course of rapid cooling, the method of cooling with pressurized liquid ammonia or cool ammonia gas would be most effective, but use of these cooling media alone would never be industrially profitable, because too much of these media would be required for direct cooling to 100 to 200° C., i.e., the decomposing temperature of melam, ureidomelamine, etc. In this connection, the present inventors have discovered that the deammoniating condensation of melamine hardly occurs at less than 300 C.; and that at less than 270° C. under the partial pressure of ammonia, by virtue of the inhibitive effect of ammonia molecules, the hydrolysis of melamine hardly takes place even if the melamine comes into contact with water molecules for a short time. Thus it has been learned that in the first step of cooling, the above-mentioned two conditions can be fulfilled by cooling to less than 270° C. To save the consumption of the cooling medium in the first step of cooling, it would be desirable to maintain the temperature at over 200° C. Thus, the desirability of the first step of rapidly cooling at the top of a pressure cooler held at a pressure of 5 to 100 kg./cm.$^2$ a crude molten melamine or a mixture of said melamine with ammonia, carbon dioxide, etc., to 200 to 270° C. by uniformly atomizing liquid ammonia or cool ammonia gas and blending it with said melamine or its mixture has been established. The second step of cooling has been predicated on the new knowledge that after the solidification of melamine in the first step, the hydrolysis of crude melamine can be almost perfectly controlled with remarkable reduction of the products of deammoniating condensation and the products of hydrolysis of the melamine by cooling the crude molten melamine to 100 to 200° C. by means of an aqueous solution containing ammonia.

The ammonia concentration in the ammonia-containing aqueous solution for the second cooling step has been chosen in order to decompose melam, ureidomelamine, etc., so that the aqueous solution which dissolved melamine and the accompanying gases may have an ammonia concentration of 5 to 80% by weight, preferably 20 to 50% by weight. Details about this concentration will be given later.

Since the melamine synthesis pressure is commonly about 100 kg./cm.$^2$, the pressure cooler must be operated at less than 100 kg./cm.$^2$ and the lower limit to the pressure should be 5 kg./cm.$^2$ because an aqueous solution with high concentrations of ammonia and carbamate has to be recovered, and melam, ureidomelamine, etc. have to be decomposed at 100 to 200° C. Thus, it would be understood that the desirable range of pressures is 5 to 100 kg./cm.$^2$.

Next, even if the two-step cooling method can inhibit the formation of undesirable impurities, melam, ureidomelamine, etc., which exist naturally in small quantities for equilibrium in the melamine synthesis solution, must be decomposed and eliminated to produce high-purity melamine. In the past decomposition by means of an aqueous alkali solution has been proposed for this purpose. Investigations by the present inventors, however, show that in the temperature range of 100 to 200° C. and with an ammonia concentration of 5 to 20% by weight, it is certain that the decomposition of melam, ureidomelamine, etc. can be expedited; but this is accompanied by an increased rate of melamine hydrolysis, with the undesirable result that although the melamine purity ostensibly improves, its yield drops heavily. It has been learned, however, that the melamine hydrolysis can to a great extent be suppressed by increased concentration of ammonia.

The solubility of melamine in ammonia water and the effect of carbon dioxide addition to ammonia water have remained totally unknown; and out of the necessity for the process of purifying the melamine with alkali at high temperatures, an estimate was tried on the basis of solubility of melamine in pure water and in pure liquid ammonia. However, the present inventors have discovered that unlike the solubility estimated by the common method, the solubility of melamine in high-temperature ammonia water under pressure is extraordinary.

Melamine solubility in water under atmospheric pressure is very poor, being for example about 5 g./100 g. of water at 100° C. Its solubility increases exponentially with the temperature; for instance, at 160° C. it becomes about 30 g./100 g. of water. The melamine solubility to ammonia water under the change of ammonia concentration at the same temperature is scarcely influenced by the ammonia concentration so long as the temperature is below 120° C.; however, when the temperature exceeds 140° C., the melamine solubility will gradually drop with an increase in the ammonia concentration. And at over 80% of ammonia concentration, regardless of the temperature changes, the melamine solubility makes a sharp drop, according to the inventor's discovery. The relationship between the temperature in degrees centigrade, the ammonia concentration in terms of percent by weight and the melamine solubility (in terms of g./100 g.—ammonia water or mixture of ammonia and carbon dioxide as mixed solvent) will be fully understood from the following table.

MELAMINE SOLUBILITY IN GRAMS OF MELAMINE PER GRAM OF SOLUTION

| Ammonia concentration, percent | 0 | 20 | 40 | 60 | 80 | 90 |
|---|---|---|---|---|---|---|
| Temperature, ° C.: | | | | | | |
| 100 | 5.0 | 4.6 | 5.0 | 6.2 | 6.2 | 4.0 |
| 120 | 9.5 | 8.0 | 8.0 | 8.9 | 7.5 | 3.5 |
| 140 | 18.0 | 14.5 | 13.2 | 13.0 | 9.4 | 2.0 |
| 160 | 30.0 | 24.4 | 22.0 | 18.0 | 12.0 | 1.5 |
| 180 | 47.5 | 41.0 | 36.0 | 25.0 | 14.6 | 1.0 |

The conditions which result in the decomposition of melam, ureidomelamine, etc. are a temperature in the range of 100 to 200° C., and an ammonia concentration in the range of 5 to 80% by weight, preferably 20 to 50% by weight. Below 100° C., ureidomelamine would not be perfectly decomposed. If, however, the temperature is higher than 200° C., the hydrolysis of melamine will be promoted; accordingly an extraordinarily high ammonia concentration would be required for the inhibition of hydrolysis, which is impractical.

At an ammonia concentration of less than 5% by weight the decomposition of melam, ureidomelamine, etc. will not be so vigorous, but at over 80% by weight the melamine solubility will be remarkably reduced, which is unfavorable.

Therefore, the ammonia concentration is selected in the range of 5 to 80% by weight in reverse proportion to the content of melam, ureidomelamine, etc., the preferable value being 20 to 50% by weight.

At a concentration of less than 20% by weight, the hydrolysis of melamine is promoted to a certain extent, while at a concentration in excess of 50% by weight the pressure must be raised due to an increased difficulty of operation.

Meanwhile, so long as the amount of carbon dioxide in the melamine solvent remains no greater than the amount produced as a byproduct from melamine synthesis, there is no need for special attention to the decomposing conditions of melam, ureidomelamine, etc.

Further, the inventors have discovered that the violent agitation of crude melamine solution is highly effective in producing high-purity melamine with high yield. The reason for this effect is supposed to be as follows: Even if the conditions are perfect for fully dissolving melamine, the impurities in it remain suspended in the solution without being dissolved and accordingly the decomposition of these impurities is hindered by their resistance to dissolution; thus, agitation helps the dissolution, i.e., decomposition of these impurities. Also agitation is desirable in the sense that it promotes the cooling effect in the second step.

The crystallization of melamine out of the melamine solution is carried out in two steps, first in the degasification tank and then in the crystallizing tank. As the solvent for the melamine solution is high-concentration ammonia water, the operation in the degasification tank is simply to depressurize it to atmospheric pressure or a higher pressure than atmospheric pressure, thus the melamine can be partly crystallized, while at the same time the liquid ammonia, the concentrated ammonia water and the concentrated carbamate aqueous solution can be recovered and accordingly an advantageous recirculation of by-product gases to the urea system is made possible, thereby realizing high-energy recovery.

From the above description of the present invention, various industrially profitable applications are conceivable. The following is an explanation of the attached flow sheet which illustrates the steps embodying the process according to the present invention.

After leaving of the melamine reactor (not shown), the crude molten melamine or a mixture of said melamine with ammonia, carbon dioxide, etc. passes through a pipe 1 where it is depressurized and atomized and then enters a pressure cooler 2, which is composed of the first step cooling section 23 (200 to 270° C.) at the top, the second step cooling section 18 (100 to 200° C.) in the middle, and the melamine-dissolving and impurities-decomposing section (100 to 200° C.) at the bottom. This pressure cooler is maintained at a pressure of 5 to 100 kg./cm.$^2$ and an ammonia concentration of 5 to 80% by weight.

The melamine solution extracted from a pipe 3 is depressurized and cooled in the degasification column 5 which is maintained at a pressure of 1 to 15 kg./cm.$^2$ and a temperature of 60 to 130° C., so that it becomes partly crystallized. Of course it is possible to provide a filter intermediate the way to the pipe 3. The melamine slurry discharged out of the degasification column 5 passes through a pipe 7 into a crystallizing tank 8. As this tank 8 is maintained at a pressure of 30 to 760 mm. Hg absolute and a temperature of 20 to 60° C., the greater part of the melamine is crystallized there. The crystallized melamine leaves the tank 8 through a pipe 10, which leads to a centrifugal separator 11, where it is separated into crystals and mother liquor. The crystals thus separated are taken out through a pipe 12, while the mother liquor from a pipe 13 is partly discharged through a discharge pipe 14. The rest of the mother liquor passes through a pipe 15 and, after being compressed by a pump 16, joins the fluid from a pipe 17 which extracts circulating fluid used to agitate the pressure cooler 2, and then reaches the second cooling section 18 to be atomized. On the other hand, the gases coming out of the degasification column 5 are extracted through a pipe 19 and introduced into a distillation column 20. Excess ammonia passes through a condenser 21, is pressurized in the compressor 22, and is recovered as liquid ammonia by a cooler 24. It is then partly atomized in the first cooling section 23 at the top of the pressure cooler 2, while the rest of it is recovered through a pipe 35. The concentrated ammonia water is recovered through the gas solution-exracting pipe 33 of the distillation column 20 or, if carbon dioxide exists in the system, the concentrated carbamate solution is partly recovered through a pipe 34 for urea synthesis, while the rest flows into the mother liquor circulating pipe 15. Meanwhile, the gases discharged from the crystallizing tank 8 pass through a pipe 25 and, after being washed with water from a pipe 27 in a washing column 26, enter a stream ejector 28, into which the steam is introduced through a pipe 29. The fluid obtained in the washing column 26 passes through a pipe 30 and is utilized as the washing fluid for the centrifugal separator 11. The liquid levels in the devices 2, 5 and 8 are controlled by the level gauges 4, 6 and 9. References 31 and 32 respectively designate the heating coil and the cooling coil.

The principle of the present invention will now be illustrated by the following examples. The scope of the invention is not, however, limited to the species of these examples. In the following description, the percentage is given by weight unless otherwise specified.

EXAMPLE 1

In a melamine reactor held at 400° C. and 100 kg./cm.$^2$, urea was decomposed. The resultant reaction mixture, (crude molten melamine 26%, ammonia 47%, and carbon dioxide 27%), before being depressurized and atomized in the pressure cooler held at 4 kg./cm.$^2$, and supplied at the rate of 100 kg./hr. was, in the first step of cooling, cooled to about 250° C. by liquid ammonia supplied at the rate of 200 kg./hr.; and in the second step cooled within the pressure cooler by means of a mixture of circulating liquid for agitation and circulating mother liquor supplied at the rate of 100,000 kg./hr. Consequently, the liquid in the pressure cooler was composed of about 12% melamine and 40% ammonia, the retention time in the cooler being 60 minutes. This mixed melamine solution was depressurized and introduced into the degasification column at 100° C. and 5 kg./cm.$^2$. The gas discharged from the top was distilled and recovered as liquid ammonia at the rate of 200 kg./hr., while the rest of the gasses was obtained as a carbamate solution suitable for the synthesis of urea. The melamine slurry (composed of 25% ammonia, 10% carbon dioxide, and 65% water) formed in the degasification column was next introduced into the crystallizing tank to be depressurized and cooled to 250 mm. Hg absolute and 30° C. After full crystallization of the melamine, melamine was separated out at the rate of 250 kg./hr. by the centrifugal separator, the yield being 97.5% on the basis of the crude melamine. Mother liquor separated from the melamine and the gases discharged out of the crystallizing tank were recovered, and 80% of them was recirculated to the pressure cooler.

Analysis of the recovered melamine shows that the product contains 99.5% melamine, 0.2% melam, 0.2% ammeline, and 0.1% of other substances.

A similar product which was obtained by the same process, except for the pressure filter provided midway between the pressure cooler and the degasification column, was analyzed and found to contain 99.8% melamine and 0.2% ammeline, with no impurities detected.

EXAMPLE 2

The by-product gases were separated from the reaction mixture obtained by the thermal decomposition of urea at 400° C., and 100 kg./cm.$^2$. Then, under increased partial ammonia pressure, the melamine conversion was matured. Said mixture was then depressurized and atomized in the pressure cooler. The atomization was effected uniformly, with the proportion of liquid ammonia to molten melamine set at a ratio of 0.3 by weight. After being instantaneously cooled and solidfied to about 250° C., the molten melamine was further cooled and solidified by means of a mixture of circulating liquid for agitation and circulating mother liquor, and then dissolved. The amount of circulating liquid was set at about 500 times by weight the amount of melamine atomized. The inside pressure of the pressure cooler was kept at 20 kg./cm.$^2$; and using the ammonia for the first step cooling and the ammonia contained in the circulating mother liquor, the melamine solution composition was maintained a melamine 15%, and ammonia 23%. The solution was retained in the cooler for 60 minutes.

After that, the solution was introduced into the degasification column held at 80° C., 5 kg./cm.$^2$, and the solution was rapidly depressurized and cooled to crystallize melamine. The melamine slurry thus obtained was delivered from the degasification column to the crystallizing tank held at 100 mm. Hg absolute and 30° C. and left there for 200 minutes. Then, the melamine crystals were separated by the centrifugal separator. The ammonia recovered by the degasification column was utilized for the first step cooling in the pressure cooler. The ammonia discharged from the top of crystallizing tank was absorbed by the gas-washing water of the steam ejector and this water was utilized for washing the centrifugal separator. The mother liquor obtained after separation of the melamine crystals was recirculated to the pressure cooler.

The composition of the recovered melamine was: melamine—99.8%, substances insoluble in an aqueous alkali solution such as melam—less than 0.1%, ammeline—less than 0.1%, with no ammelide detected. The yield was 98.3% on the basis of the crude melamine.

EXAMPLE 3

Crude molten melamine synthesized under the same conditions as in Example 2 was cooled in two steps under the same conditions as in Example 2, but the pressure cooler was held at 45 kg./cm.$^2$. In this case, the composition of the melamine solution was: melamine 25%, ammonia concentration 41.5%. Analysis of the recovered melamine showed 99.9% melamine with practically no impurities detectable. The yield was 98.5% on the basis of the crude melamine.

What is claimed is:
1. A process for recovering purified melamine from a high pressure liquid phase in which deammoniating condensation and hydrolysis of the molten melamine is prevented, comprising rapidly cooling a material selected from the group consisting of the crude molten melamine and a mixture of crude molten melamine, ammonia and carbon dioxide resulting from the thermal decomposition of urea by first rapidly cooling said material under a pressure of from 5 to 100 kg./cm.$^2$ to between 200 and 270° C. by uniformly atomizing said material and blending it with cool fluid ammonia, thereby solidifying the melamine and, in a second step, cooling said material to 100 to 200° C. with an aqueous solution containing ammonia.

2. The process for recovering purified melamine as claimed in claim 1 in which the cooled and solidified melamine derived from said second step is dissolved in an aqueous solution containing a concentration of 5 to 80% ammonia by weight, and then decomposing and eliminating the impurities in the dissolved melamine at a temperature between 100 and 200° C.

3. The process for recovering purified melamine as claimed in claim 2 in which said aqueous solution contains a concentration of 20 to 50% ammonia by weight.

4. The process of claim 2 in which the melamine in said purified melamine solution is crystallized by first expanding the melamine solution at a pressure between 1 and 15 kg./cm.$^2$, thereby crystallizing a part of the melamine, and recovering the dissolved gases and in a second step fully crystallizing the melamine in the formed melamine slurry under a pressure between 30 and 760 mm. Hg absolute and a temperature between 20 and 60° C.

References Cited
UNITED STATES PATENTS

| | | | |
|---|---|---|---|
| 3,310,558 | 3/1967 | Oele et al. | 260—249.7 |
| 3,513,167 | 5/1970 | Fromm et al. | 260—249.7 |

JOHN M. FORD, Primary Examiner